US006885989B2

(12) United States Patent
McLean et al.

(10) Patent No.: US 6,885,989 B2
(45) Date of Patent: Apr. 26, 2005

(54) METHOD AND SYSTEM FOR COLLABORATIVE SPEECH RECOGNITION FOR SMALL-AREA NETWORK

(75) Inventors: James Gordon McLean, Fuquay-Varina, NC (US); Daniel James Winarski, Tucson, AZ (US); Tin-Lup Wong, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/824,126

(22) Filed: Apr. 2, 2001

(65) Prior Publication Data

US 2002/0143532 A1 Oct. 3, 2002

(51) Int. Cl.[7] .................................................. G10L 15/26
(52) U.S. Cl. ....................... 704/235; 704/270; 704/277
(58) Field of Search ................................ 704/233, 235, 704/243, 277, 271

(56) References Cited

U.S. PATENT DOCUMENTS

| | | | |
|---|---|---|---|
| 4,099,121 A | 7/1978 | Fang | |
| 5,520,774 A | 5/1996 | Palacios et al. | |
| 5,524,169 A | 6/1996 | Cohen et al. | |
| 5,729,658 A | 3/1998 | Hou et al. | |
| 5,754,978 A * | 5/1998 | Perez-Mendez et al. | .... 704/255 |
| 5,865,626 A | 2/1999 | Beattie et al. | |
| 5,960,336 A | 9/1999 | Ikawa et al. | |
| 5,974,383 A | 10/1999 | Fado et al. | |
| 6,016,136 A | 1/2000 | Fado et al. | |
| 6,151,576 A * | 11/2000 | Warnock et al. | ............ 704/260 |
| 6,243,676 B1 * | 6/2001 | Witteman | .................... 704/243 |
| 6,513,003 B1 * | 1/2003 | Angell et al. | ............... 704/235 |
| 6,577,333 B2 * | 6/2003 | Tai et al. | ................. 348/14.08 |
| 6,618,704 B2 * | 9/2003 | Kanevsky et al. | .......... 704/271 |
| 6,631,348 B1 * | 10/2003 | Wymore | ..................... 704/233 |
| 2002/0105598 A1 * | 8/2002 | Tai et al. | .................... 348/705 |

\* cited by examiner

*Primary Examiner*—Vijay Chawan
*Assistant Examiner*—Michael N. Opsasnick
(74) *Attorney, Agent, or Firm*—Sawyer Law Group LLP

(57) ABSTRACT

The present invention provides a method and system for collaborative speech recognition in a network. The method includes: capturing speech as at least one audio stream by at least one capturing device; producing a plurality of text streams from the at least one audio stream by at least one recognition device; and determining a best recognized text stream from the plurality of text streams. The present invention allows multiple computing devices connecting to a network, such as a Small Area Network (SAN), to collaborate on a speech recognition task. The devices are able to share or exchange audio data and determine the best quality audio. The devices are also able to share text results from the speech recognition task and the best result from the speech recognition task. This increases the efficiency of the speech recognition process and the quality of the final text stream.

32 Claims, 4 Drawing Sheets

METHOD AND SYSTEM FOR COLLABORATIVE SPEECH RECOGNITION FOR SMALL-AREA NETWORK

FIELD OF THE INVENTION

The present invention relates to computer networks, and more particularly to the processing of audio data in computer networks.

BACKGROUND OF THE INVENTION

Mobile computers and Personal Digital Assistants, or PDAs, are becoming more common in meeting rooms and other group work situations. Various network protocols that allow such systems to share and exchange information are emerging, such as in a Small Area Network (SAN) using the Bluetooth™ protocol, sponsored by International Business Machines Corporation™. Simultaneously, advances in speech recognition technology are allowing high-quality speech transcription. In a SAN, there could be one or more devices with the capability of capturing speech as audio data. Also, one or more devices could have speech recognition technology. However, these devices are not able to share or exchange the audio data or the results of the speech recognition, and thus, the overall speech recognition task in a group environment is not efficient.

Accordingly, what is needed is a system and method for collaborative speech recognition in a network. The present invention addresses such a need.

SUMMARY OF THE INVENTION

The present invention provides a method and system for collaborative speech recognition in a network. The method includes: capturing speech as at least one audio stream by at least one capturing device; producing a plurality of text streams from the at least one audio stream by at least one recognition device; and determining a best recognized text stream from the plurality of text streams. The present invention allows multiple computing devices connecting to a network, such as a Small Area Network (SAN), to collaborate on a speech recognition task. The devices are able to share or exchange audio data and determine the best quality audio. The devices are also able to share text results from the speech recognition task and the best result from the speech recognition task. This increases the efficiency of the speech recognition process and the quality of the final text stream.

DETAILED DESCRIPTION

The present invention relates to a system and method for collaborative speech recognition. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

To more particularly describe the features of the present invention, please refer to FIGS. 1 through 4 in conjunction with the discussion below.

Figure 1:
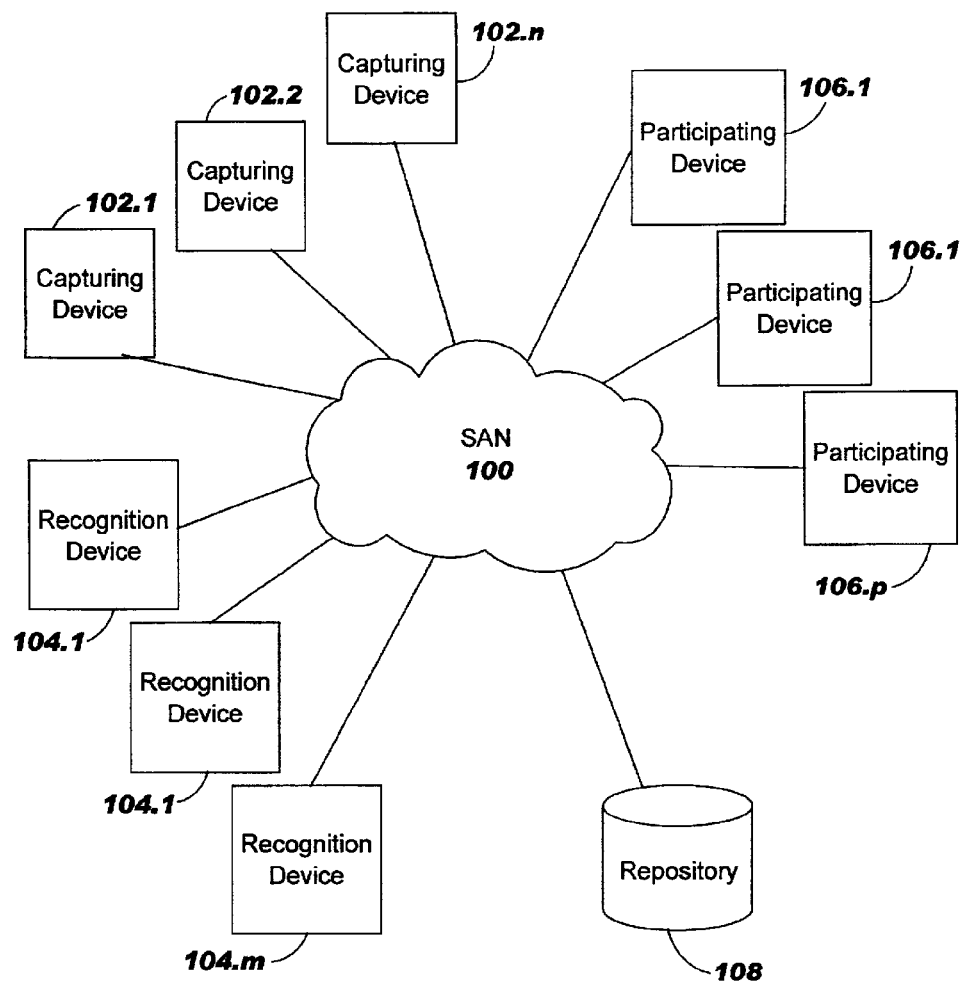
FIG. 1 illustrates a preferred embodiment of a system which provides collaborative speech recognition in a network in accordance with the present invention.

The method and system in accordance with the present invention allows multiple computing devices connecting to a network, such as a Small Area Network (SAN), to collaborate on a speech recognition task. FIG. 1 illustrates a preferred embodiment of a system which provides collaborative speech recognition in a network in accordance with the present invention. The system comprises a plurality of devices connected to the SAN 100. The plurality of devices includes capturing devices 102.1–102.$n$, recognition devices 104.1–104.$m$, and participating devices 106.1–106.$p$. The system also includes a repository 108 which is capable of storing data. In this specification, "capturing devices" refers to devices in the system which have speech capturing technology. Capturing devices may include mobile or PDA's equipped with microphones. "Recognition devices" refers to devices in the system which have speech recognition technology. "Participating devices" refers to devices in the system that are actively (i.e., performing a sub-task) or passively (i.e., monitoring or receiving the text output of the process) involved in the speech process recognition in accordance with the present invention. The capturing, recognition, and participating devices may or may not be the same devices. The repository 108 could be any one of the devices in the system. In the SAN architecture, one of the devices is designated as the arbitrating computer. In the preferred embodiment, the designated arbitrating computer comprises software for implementing the collaborative speech recognition in accordance with the present invention. The SAN architecture is well known in the art and will not be described further here.

Figure 2:
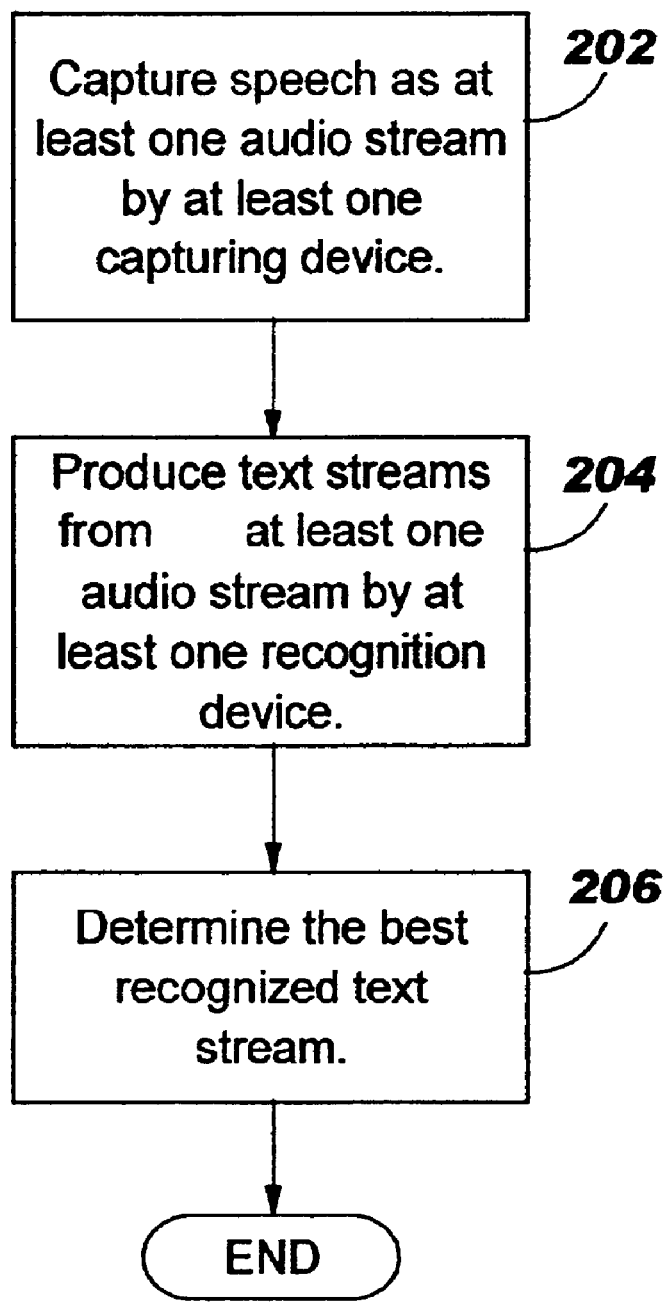
FIG. 2 is a flowchart illustrating a method for collaborative speech recognition in a network in accordance with the present invention.

FIG. 2 is a flowchart illustrating a method for collaborative speech recognition in a network in accordance with the present invention. First, speech is captured as at least one audio stream by at least one capturing device 102.1–102.$n$, via step 202. When speech is occurring, the at least one capturing device 102.1–102.$n$ captures the speech in the form of audio data. Next, text streams are produced from the captured at least one audio stream by one or more recognition devices 104.1–104.$m$, via step 204. Each recognition device 104.1–104.$m$ applies its own speech recognition process to the captured audio stream(s), resulting in a recognized text stream from each recognition device 104.1–104.$m$. Then, the best recognized text stream is determined, via step 206. Steps 202–206 would be performed for each instance of speech. Thus, for a typical conversation, these steps are repeated numerous times. In this manner, the various devices in the system are able to collaborate on a speech recognition task, thus providing collaborative speech recognition in the network 100.

Figure 3:
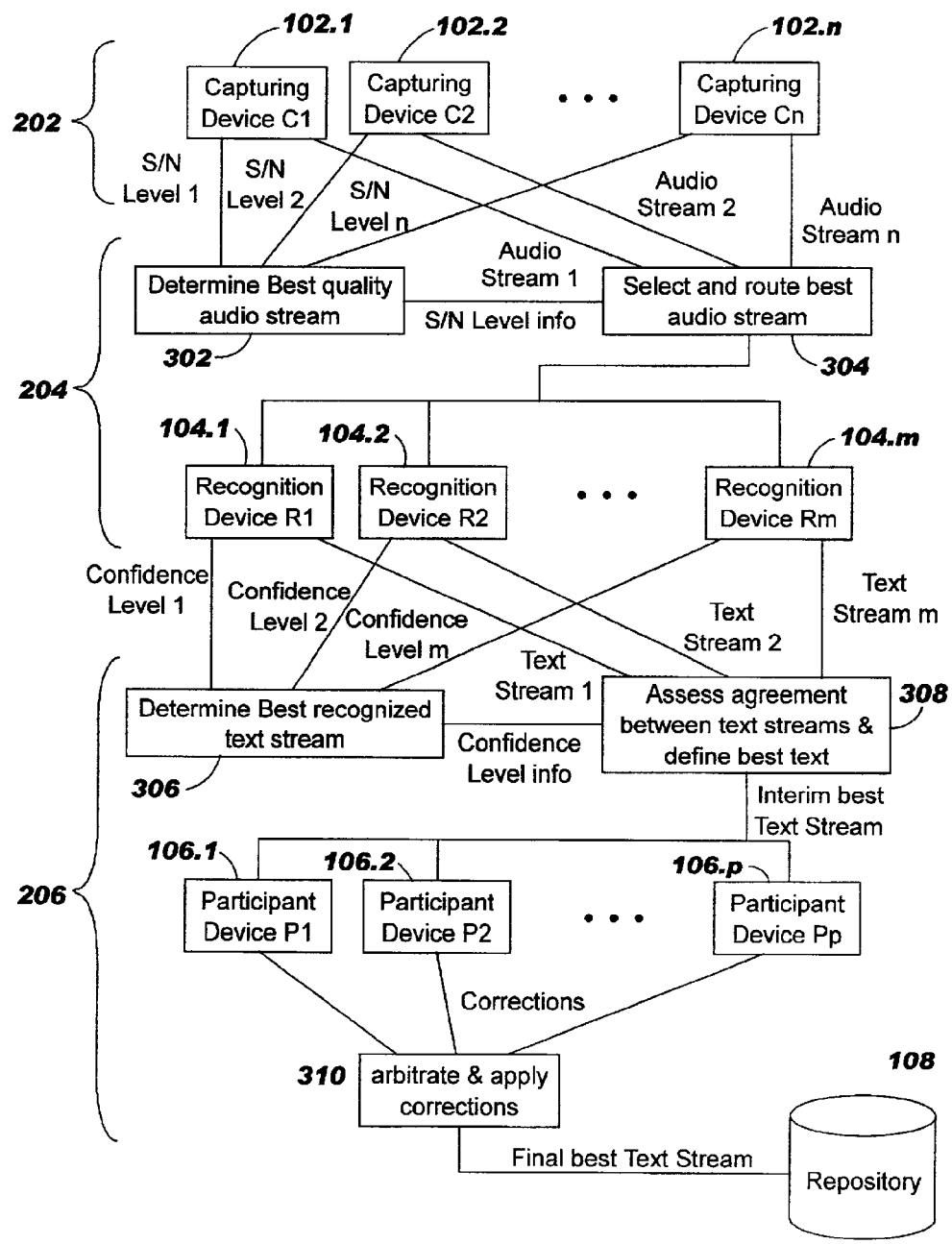
FIG. 3 is a process flow diagram illustrating a first preferred embodiment of the method for collaborative speech recognition in a network in accordance with the present

FIG. 3 is a process flow diagram illustrating a first preferred embodiment of the method for collaborative speech recognition in a network in accordance with the present invention. First, the capturing devices 102.1–102.$n$ each captures audio data, via step 202. In this embodiment, the quality of each captured data stream is then determined, via step 302. This determination may be done by the capturing devices 102.1–102.n, by the designated arbitrating computer, or both. Each capturing device's input to the collaborative recognition system may be weighted according to self-calculated recognition confidence, sound pressure level, signal-to-noise ratio, and/or manual corrections made on the fly. For example, the closest PDA to the person speaking at any given moment may have the highest SNR (signal to noise ratio), and would therefore be chosen as the "best" source at that moment. Depending on the implementation details and the SAN bandwidth, all audio streams may be transmitted via the SAN 100 for analysis in a central or distributed manner, or each devices' own quality rating may be negotiated and a single "best" stream selected on this basis.

Once the best audio stream is determined, this audio stream may then be routed over the SAN protocol to the recognition devices 104.1–104.m, via step 304. Each of these recognition devices 104.1–104.m applies its own speech recognition process to the best audio stream presented. For example, a particular device's recognition may have been optimized via a training process to recognize the voice of a particular user. Thus, even identical speech recognition software may result in different results based upon the same audio stream.

Text streams are then produced from the best audio stream, via step 206. Each recognition device 104.1–104.m provides its text stream, as well as its self-determined confidence rating, to the system. An arbitrating computer (or a distributed process amongst the participating devices) compares the various text streams to determine the best recognized text via step 306. Whether the text streams agree in their text recognition is a factor in determining the best recognized text stream, via step 308. Multiple text streams agreeing to the same translation are considered to increase the likelihood that a given translation is correct.

An interim best text stream is thus defined and offered via the SAN 100 to the participating devices 106.1–106.p. Some or all of the participating devices 106.1–106.p have the opportunity to edit, delete, amend, or otherwise modify the interim best text stream before it is utilized. This can be done manually by a user at a participating device 106.1–106.p or automatically based on one or more attributes. The modifications may include adding an indication of the person speaking or any other annotation. The annotations may be added in real-time. These modifications or corrections are arbitrated and applied to the interim best text stream, via step 310. The final best text stream may then be stored in the repository 108. The repository 108 can be integrated with an information-storage tool, such as a Lotus™ Notes project database or other similar information-storage tool.

Figure 4:
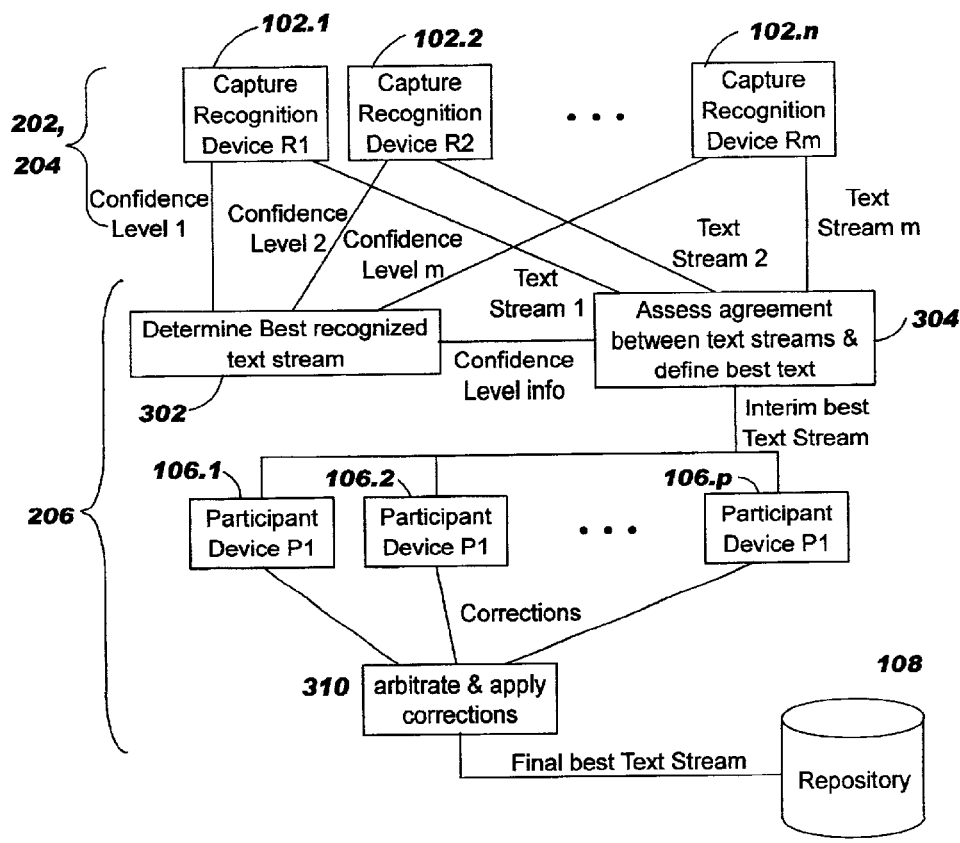
FIG. 4 is a process flow illustrating a second preferred embodiment of a method for collaborative speech recognition in a network in accordance with the present invention.

FIG. 4 is a process flow illustrating a second preferred embodiment of a method for collaborative speech recognition in a network in accordance with the present invention. In the second preferred embodiment, the method is the same as the first preferred embodiment, except the capturing of audio streams, via step 202, and the production of the text streams, via step 206, are performed by the same devices, such as devices 104.1–104.m. However, within each device, separate software programs or separate processors may perform the capturing of the audio streams and the production of the text streams. Each capture/recognition device 104.1–104.m then provides its own text stream, as well as its self-determined confidence rating, to the system. The various text streams are compared to determine the best recognized text stream, via step 306. Whether the text streams agree in their text recognition is a factor in the best recognized text stream, via step 308. An interim best text stream is thus defined and offered via the SAN 100 to the participating devices 106.1–106.p. Some or all of the participating devices 106.1–106.p may modify or correct the interim best text stream. These modifications or corrections are arbitrated and applied, via step 310. The final best text stream may then be stored in the repository 108.

Although the present invention is described above in the context of a SAN, one of ordinary skill in the art will understand that the present invention may be used in other contexts without departing from the spirit and scope of the present invention.

A method and system for collaborative speech recognition in a network has been disclosed. The present invention allows multiple computing devices connecting to a network, such as a Small Area Network (SAN), to collaborate on a speech recognition task. The devices are able to share or exchange audio data and determine the best quality audio. The devices are also able to share text results from the speech recognition task and determine the best result from the speech recognition ask. This increases the efficiency of the speech recognition process and the quality of the final text stream.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for collaborative speech recognition in a network, comprising the steps of:
   (a) capturing speech as at least one audio stream by at least one capturing device;
   (b) producing a plurality of text streams from the at least one audio stream by at least one recognition device; and
   (c) determining a best recognized text stream from the plurality of text streams, wherein the determining comprises:
      (c1) assessing agreement between the plurality of text streams to obtain an interim best recognized text stream,
      (c2) routing the interim best recognized text stream to a plurality of participant devices,
      (c3) modifying the interim best recognized text stream by each of the plurality of participant devices, and
      (c4) arbitrating the modifications to obtain the best recognized text stream.

2. The method of claim 1, wherein the producing step (b) comprises:
   (b1) producing the plurality of text streams from a best quality audio stream of a plurality of audio streams.

3. The method of claim 1, further comprising:
   (d) storing the best recognized text stream in a repository.

4. The method of claim 1, wherein the at least one capturing device and the at least one recognition device is the same device.

5. The method of claim 1, wherein a capturing device is a device which comprises speech recognition technology.

6. The method of claim 1, wherein a recognition device is a device which comprises speech recognition technology.

7. The method of claim 1, wherein the capturing step (a) further comprises:
   (a1) determining a best quality audio stream from a plurality of audio streams.

8. The method of claim 7 further comprising:
   (a2) routing the best quality audio stream to a plurality of recognition devices.

9. A method for collaborative speech recognition in a network, comprising the steps of:
(a) capturing speech as a plurality of audio streams by a plurality of capturing devices;
(b) determining a best quality audio stream from the plurality of audio streams;
(c) producing a plurality of text streams from the best quality audio stream by at least one recognition device; and
(d) determining a best recognized text stream from the plurality of text streams, wherein the determining comprises:
(d1) assessing agreement between the plurality of text streams to obtain an interim best recognized text stream,
(d2) routing the interim best recognized text stream to a plurality of participant devices,
(d3) modifying the interim best recognized text stream by each of the plurality of participant devices, and
(d4) arbitrating the modifications to obtain the best recognized text stream.

10. The method of claim 9, wherein the determining step (b) further comprises:
(b1) routing the best quality audio stream to the at least one recognition device.

11. The method of claim 9, further comprising:
(e) storing the best recognized text stream in a repository.

12. The method of claim 9, wherein the plurality of capturing devices and the at least one recognition device are the same devices.

13. The method of claim 9, wherein a capturing device is a device which comprises speech recognition technology.

14. The method of claim 9, wherein a recognition device is a device which comprises speech recognition technology.

15. A computer readable medium with program instructions for providing collaborative speech recognition in a network, the instructions for:
(a) capturing speech as at least one audio stream by at least one capturing device;
(b) producing a plurality of text streams from the at least one audio stream by at least one recognition device; and
(c) determining a best recognized text stream from the plurality of text streams, wherein the determining comprises:
(c1) assessing agreement between the plurality of text streams to obtain an interim best recognized text stream,
(c2) routing the interim best recognized text stream to a plurality of participant devices,
(c3) modifying the interim best recognized text stream by each of the plurality of participant devices, and
(c4) arbitrating the modifications to obtain the best recognized text stream.

16. The medium of claim 15, wherein the producing instruction (b) comprises instructions for:
(b1) producing the plurality of text streams from a best quality audio stream of a plurality of audio streams.

17. The medium of claim 15, further comprising instructions for:
(d) storing the best recognized text stream in a repository.

18. The medium of claim 15, wherein the at least one capturing device and the at least one recognition device is the same device.

19. The medium of claim 15, wherein a capturing device is a device which comprises speech recognition technology.

20. The medium of claim 15, wherein a recognition device is a device which comprises speech recognition technology.

21. The medium of claim 15, wherein a capturing device is a device which comprises speech recognition technology.

22. The medium of claim 15, wherein a recognition device is a device which comprises speech recognition technology.

23. The medium of claim 15, wherein the capturing instruction (a) further comprises instructions for:
(a1) determining a best quality audio stream from a plurality of audio streams.

24. The medium of claim 23, further comprising instructions for:
(a2) routing the best quality audio stream to a plurality of recognition devices.

25. A computer readable medium with program instructions for providing collaborative speech recognition in a network, the instructions for:
(a) capturing speech as a plurality of audio streams by a plurality of capturing devices;
(b) determining a best quality audio stream from the plurality of audio streams;
(c) producing a plurality of text streams from the best quality audio stream by at least one recognition device; and
(d) determining a best recognized text stream from the plurality of text streams, wherein the determining comprises:
(d1) assessing agreement between the plurality of text streams to obtain an interim best recognized text stream,
(d2) routing the interim best recognized text stream to a plurality of participant devices,
(d3) modifying the interim best recognized text stream by each of the plurality of participant devices, and
(d4) arbitrating the modifications to obtain the best recognized text stream.

26. The medium of claim 25, wherein the determining instruction (b) further comprises instructions for:
(b1) routing the best quality audio stream to the at least one recognition device.

27. The medium of claim 25, further comprising instructions for:
(e) storing the best recognized text stream in a repository.

28. The medium of claim 25, wherein the plurality of capturing devices and the at least one recognition device are the same devices.

29. The medium of claim 25, wherein a capturing device is a device which comprises speech recognition technology.

30. The medium of claim 25, wherein a recognition device is a device which comprises speech recognition technology.

31. A system, comprising:
at least one capturing device, wherein the at least one capturing device comprises speech capture technology, wherein the at least one capturing device is capable of capturing at least one audio stream;
at least one recognition device, wherein the at least one recognition device comprises speech recognition technology, wherein the at least one recognition device is capable of producing a plurality of text streams from the at least one audio stream;
a designated arbitration device, wherein the designated arbitration device is capable of determining an interim best recognized text stream from the plurality of text streams; and
a plurality of participant devices, wherein each of the plurality of participant devices is capable of applying a modification to the interim best recognized text stream, wherein the modifications are arbitrated to obtain a best recognized text stream.

32. The system of claim 31, further comprising:
a repository for storing the best recognized text stream.

* * * * *

UNITED STATES PATENT AND TRADEMARK OFFICE
CERTIFICATE OF CORRECTION

PATENT NO. : 6,885,989 B2
APPLICATION NO. : 09/824126
DATED : April 26, 2005
INVENTOR(S) : McLean et al.

It is certified that error appears in the above-identified patent and that said Letters Patent is hereby corrected as shown below:

In column 1, line 60, add -- invention. -- after the word "present".
In column 2, line 26, add -- computers -- after the word "mobile".
In column 3, line 32, add --stream -- after the first word "text".
In column 3, line 65, add -- determining -- after the second word "in".

Signed and Sealed this

Eighth Day of August, 2006

JON W. DUDAS
*Director of the United States Patent and Trademark Office*